UNITED STATES PATENT OFFICE.

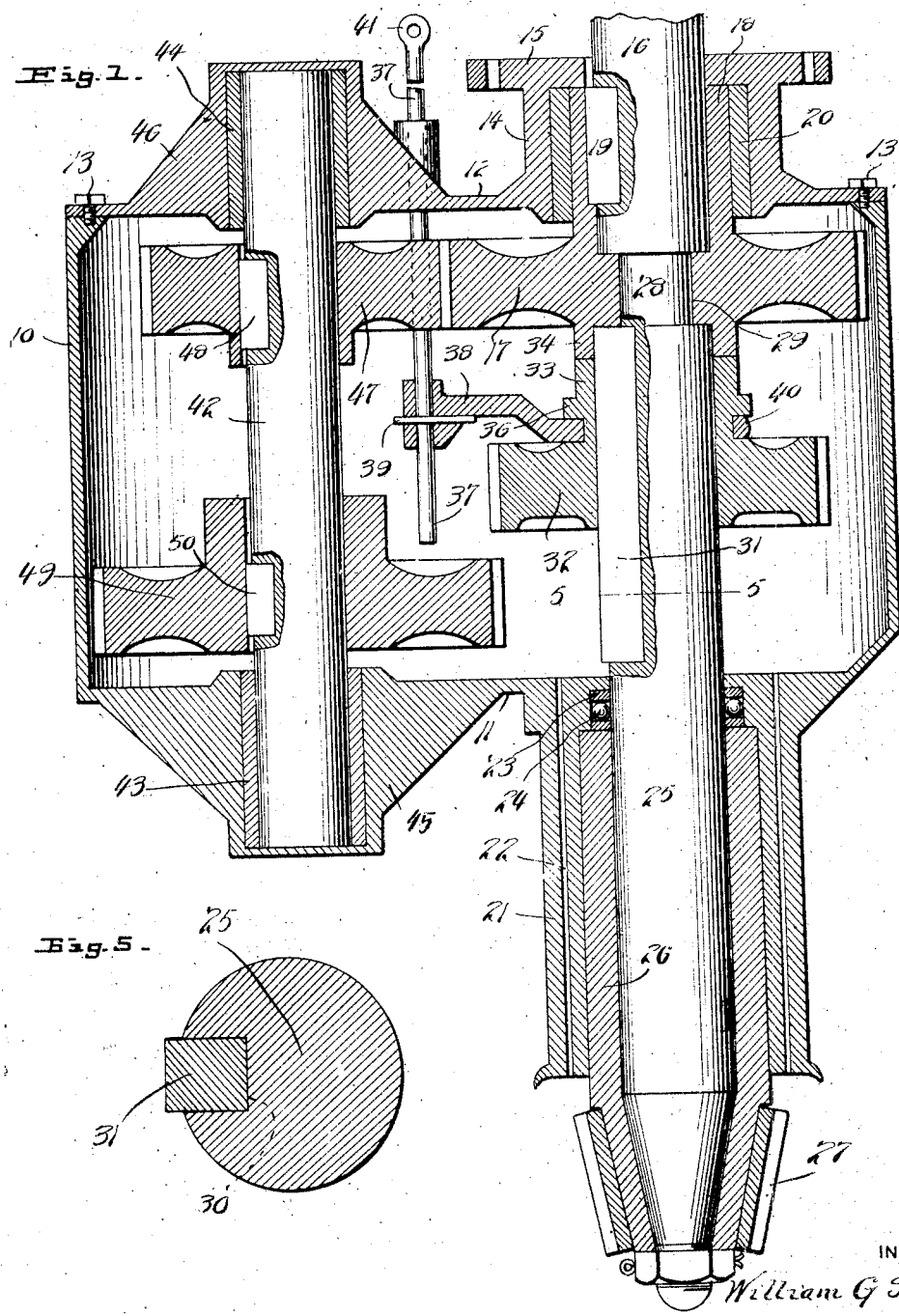

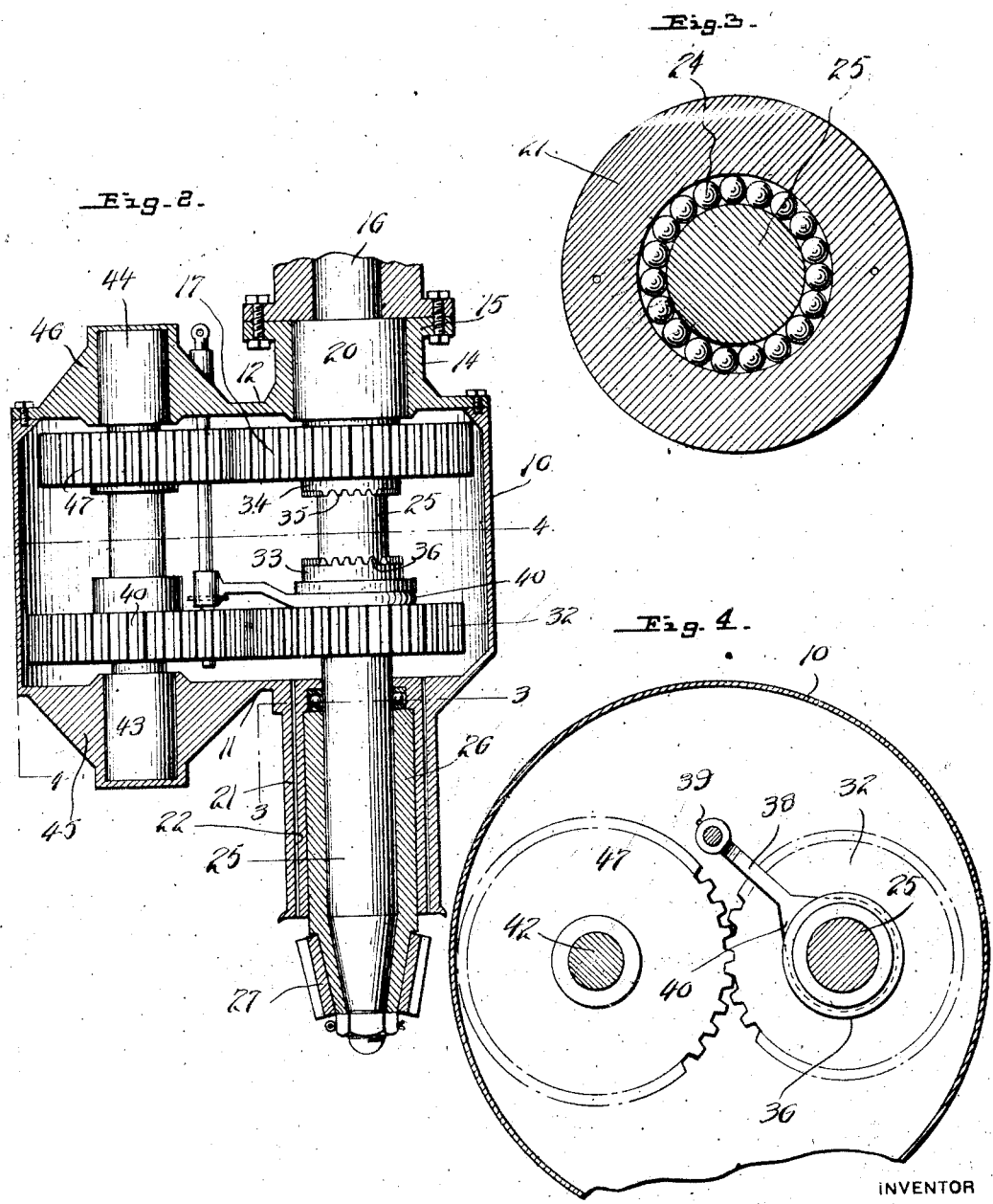

WILLIAM G. STANEK, OF RENWICK, IOWA.

TRANSMISSION-GEARING.

1,225,881.  Specification of Letters Patent.  Patented May 15, 1917.

Application filed January 27, 1916. Serial No. 74,656.

*To all whom it may concern:*

Be it known that I, WILLIAM G. STANEK, a citizen of the United States, residing at Renwick, in the county of Humboldt and State of Iowa, have invented certain new and useful Improvements in Transmission-Gearings, of which the following is a specification.

My present invention has relation to certain new and useful improvements in transmission gearing and more particularly comprehends a novel device of this nature that is especially designed to be used in connection with automobiles or other motor driven vehicles having a high and low gear clutch; and as its primary object it contemplates a device of this nature wherein the several parts are readily shiftable into different positions in order to provide an additional two speed variation of the driven gear shaft, so that four instead of two speeds are attained to the end that greater flexibility of the motor will materially increase the efficiency of the car, as a whole.

A further object of my invention is to provide a device of the type in question, that is extremely simple in construction, strong and durable, and may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in longitudinal section of the gear casing, showing clearly the relative positions of the several gears and pinions.

Fig. 2 is a view of the device as shown in Fig. 1 showing the shiftable gear in a different position.

Fig. 3 is a sectional view taken on line 3—3 of Fig. 2 showing the method of mounting the gear shaft.

Fig. 4 is a sectional view taken on line 4—4 of Fig. 2 illustrating more clearly the means for sliding the shiftable gear, and Fig. 5 is a cross sectional view taken on line 5—5 of Fig. 1.

In reducing my invention to practice, I first provide a suitable gear casing 10 that may be formed of the usual material having one side portion 11 permanently affixed thereto as shown and the other side portion 12 detachably connected as at 13. The side piece 12 is provided with a projecting carrying sleeve 14 whose outer end carries a plate 15 for attachment to a suitable support, the sleeve in turn receiving one end of a driven shaft 16 that may be of any desirable construction. This casing 10 is designed to be fastened to the differential of a Ford car in the same place as the rear bearing of the main drive shaft, using the rear bearing and housing which are in place. This casing 10 bolts on in place of the torque tube of the car, and the torque tube bolts on in front of said casing by means of bolts which pass through the apertures in plate 15. A driving pinion 17 is associated with the inner end of the driving shaft 16 as clearly shown in Fig. 1, the same carrying a collar 18 to fit snugly about the shaft, while a key 19 may be employed to lock the collar against independent rotation with respect to the shaft. Furthermore a bearing sleeve 20 may be interposed between the collar 18 and the carrying sleeve 14 above referred to, so as to eliminate friction between the said parts and tending to correctly center the driving pinion at all times. Opposite the sleeve 14, the other side piece 11 of the gear casing is provided with a similar projecting sleeve 21. This last mentioned sleeve in turn carries a bushing 22 having a ball race and ball-bearings 23 and 24, of substantially conventional form; and in turn accommodates a gear or driven shaft 25. A bearing 26 may now be interposed between the shaft 25 and the body of the bushing 22, its projecting end being utilized to support a beveled pinion 27 of the usual type.

At its inner end, the gear shaft 25 is slightly reduced as at 28 for insertion into an aperture 29 of the driving pinion 17, while it is further cut away as at 30 (see Fig. 5) to form a longitudinal key-way for the reception of a key 31.

A gear wheel 32 is splined on the gear shaft 25 through the instrumentality of the key 31 as shown in Fig. 1, the same carrying a clutch member 33 to be opposed to a coöperating clutch member 34 of the driving pinion 17, each of which are provided with clutch fingers 35 that may be brought into intermeshing engagement. The member 33 being slightly longer than the other member 34, is provided with an annular rim or boss 36 as clearly shown in Fig. 1. An operating rod 37 is mounted to be slidable within the gear casing, carrying adjacent its inner end an adjustable arm 38 as at 39, the latter having a fork or ring 40 to operate in the channel between the rim 36 and the body of the gear 32. Consequently it will be seen that by properly shifting the rod 37, the gear 32 may be moved so as to bring the clutch member 33 thereof and the fingers thereon into mesh with the fingers of the other clutch member. At its outer end the rod 37 may be provided with an eye 41, as shown in Fig. 1.

A counter-shaft 42 has its ends journaled in bearings 43 and 44 that fit into suitable sockets 45 and 46 of the side plates 11 and 12 respectively, the said counter-shaft carrying a pinion 47 through the medium of a key 48 for co-meshing engagement with the driving pinion 17. A second pinion 49 is arranged on the counter-shaft 42 through the medium of a key 50, the same being substantially greater in diameter than the pinion 47 and designed to mesh with the gear 32 at certain times as will subsequently appear.

As before stated, my improved transmission device is preferably used in conjunction with an automobile or motor driven vehicle having a two speed clutch, namely a high and low gear, being specially designed for use in connection with automobiles of the Ford type. When desiring to operate the machine on low speed, the parts having been positioned as shown in Fig. 1 with the fingers 35 of the respective clutch members 33 and 34 in meshing engagement to produce a direct connection between the driving shaft 16 and gear shaft 25 the low gear clutch of the car is then operated, and the desired first or low speed is obtained. When desiring to obtain the next or second speed, the sliding rod 37 is operated so as to shift the gear 32 into co-meshing engagement with the pinion 49 of the counter-shaft which, as is obvious, places the direct connection between the driving shaft 16 and the gear shaft 25, motion from the driving shaft being imparted to the gear shaft through the instrumentality of the driving pinion 17, the pinion 47 of the counter-shaft, hence to the pinion 49 of the counter-shaft and finally to the gear 32 and which is accomplished by actuating the low speed pedal. When desiring the third or direct speed, the operator moves the gear 32 to its first position, as shown in Fig. 1, after which the high gear clutch is thrown into operation so as to effect the desired result. Finally when desiring to attain the highest or fourth speed, the gear 32 is shifted into mesh with the large pinion 49 or the counter shaft as shown in Fig. 2 after which the high gear clutch is again moved into operation and the highest speed is obtained owing to the high gearing of the two shafts.

From the foregoing it will be noted that I have provided a novel form of transmission that is readily susceptible of application to conventional forms of motors and differential gearings and which is especially susceptible for use in connection with the mechanism of an automobile of the "Ford type." In view of the fact that the advantages and novel features of the device appear to be clearly defined from the foregoing, further detail description is deemed unnecessary.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention what I claim as new and desire to secure by Letters Patent is:—

1. In a transmission gearing, a casing having one end fixed and the other detachable, a driving shaft extending through said detachable casing end into the interior thereof, a pinion on said shaft within said casing having an elongated sleeve keyed to said driving shaft, a socket in the end of said pinion opposed to the sleeve carrying end, a driven shaft rotatable in said socket, a gear slidable on said driven shaft, coöperating clutch members carried by the socketed end of said pinion and the opposed end of said gear, a counter shaft, a pinion on said counter shaft normally meshing with said first mentioned pinion, a second pinion fixed on said counter shaft, and means for shifting said gear to cause it to mesh with said last mentioned pinion at the will of the operator.

2. The combination with a transmission device, of a gear casing having one end fixed and the other detachable, said detachable end being provided with a carrying sleeve having an attaching plate, a drive shaft having one end mounted in said sleeve and extending into said casing, a driving pinion in said casing associated with the inner end of said shaft, said pinion having an elongated sleeve at one end snugly fitting said driving shaft within said carrying sleeve and keyed to said shaft, a bearing sleeve interposed between said carrying sleeve and pinion sleeve to eliminate friction and insure the correct centering of the pinion at all times, said pinion having a socket in its inner end, a clutch member on said socket end, a driven shaft having one end rotatable in said pinion socket, a gear keyed to slide on said driven shaft and having a clutch member for coöperative engagement with the pinion carrying clutch member on the movement of said gear in one direction, a counter shaft, a pinion on said counter shaft normally meshing with said first mentioned pinion, a second pinion on said counter shaft, and means to shift said gear on said driven shaft to engage it either with said first mentioned pinion or said counter shaft pinion.

In testimony whereof I affix my signature in presence of two witnesses.

WILLIAM G. STANEK.

Witnesses:
C. A. PACKARD,
C. A. RICHARDSON.